United States Patent
Jang et al.

(10) Patent No.: US 8,502,429 B2
(45) Date of Patent: Aug. 6, 2013

(54) HYDRODYNAMIC BEARING ASSEMBLY AND MOTOR HAVING THE SAME

(75) Inventors: Ho Kyung Jang, Gyunggi-do (KR); Young Hwan Lim, Gyunggi-do (KR); Il Oung Park, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 451 days.

(21) Appl. No.: 12/926,083

(22) Filed: Oct. 25, 2010

(65) Prior Publication Data
US 2011/0115323 A1   May 19, 2011

(30) Foreign Application Priority Data
Nov. 19, 2009  (KR) .................. 10-2009-0112267

(51) Int. Cl.
*H02K 7/08* (2006.01)
*F16C 32/06* (2006.01)

(52) U.S. Cl.
USPC ............................................. 310/90; 384/107

(58) Field of Classification Search
USPC ................... 310/90; 384/100, 107, 114, 119, 384/193, 132
See application file for complete search history.

(56) References Cited

U.S. PATENT DOCUMENTS

| | | | |
|---|---|---|---|
| 2003/0197438 A1* | 10/2003 | Oku ................................ | 310/90 |
| 2004/0013331 A1* | 1/2004 | Gomyo et al. ................ | 384/107 |
| 2005/0058374 A1* | 3/2005 | Gomyo et al. ................ | 384/119 |
| 2006/0051002 A1* | 3/2006 | Sekii et al. ..................... | 384/107 |
| 2006/0193079 A1* | 8/2006 | Hoffmann et al. .......... | 360/99.08 |
| 2007/0183698 A1* | 8/2007 | Hada ............................. | 384/107 |
| 2011/0115323 A1* | 5/2011 | Jang et al. ..................... | 310/90 |

FOREIGN PATENT DOCUMENTS
JP  2006-77872  3/2006
JP  4302413  5/2009

* cited by examiner

*Primary Examiner* — Tran Nguyen
*Assistant Examiner* — David Scheuermann

(57) ABSTRACT

There is provided a hydrodynamic bearing assembly including: a sleeve against which a shaft is supported so that an upper end of the shaft, being compressed and inserted into a hub base of a rotor case, protrudes upwardly in an axial direction; a first thrust dynamic pressure generating part formed in at least one of a protrusion and the hub base corresponding to the protrusion, the protrusion being formed at an end of the sleeve along an inner diameter direction; and a second thrust dynamic pressure generating part formed around a protruding end portion of the sleeve, the protruding end portion facing an upper portion of a stopper part in the axial direction and the stopper part rotating together with the rotor case. Also, an oil sealing part has an oil interface between an outer circumferential surface of the sleeve along an outer diameter direction and an inner surface of the stopper part.

16 Claims, 5 Drawing Sheets

HYDRODYNAMIC BEARING ASSEMBLY AND MOTOR HAVING THE SAME

CROSS-REFERENCE TO RELATED APPLICATIONS

This application claims the priority of Korean Patent Application No. 10-2009-0112267 filed on Nov. 19, 2009, in the Korean Intellectual Property Office, the disclosure of which is incorporated herein by reference.

BACKGROUND OF THE INVENTION

1. Field of the Invention

The present invention relates to a hydrodynamic bearing assembly and a motor having the same, and more particularly, to a hydrodynamic bearing assembly having thrust dynamic pressure generating parts formed in a lower portion of an exterior end of a sleeve along an outer diameter direction thereof and in an upper portion of a protrusion at an end of the sleeve along an inner diameter direction thereof to allow for a reduction in starting friction torque in a motor without a reduction in the lifting force of the motor, and the motor having the hydrodynamic bearing assembly.

2. Description of the Related Art

A small-sized spindle motor, used in a recording disc driving device, uses a hydrodynamic bearing assembly. When oil is disposed between a shaft and a sleeve of the hydrodynamic bearing assembly, the shaft is driven by fluid pressure generated by the oil.

In recent years, in line with the improved performance of recording disc driving devices, the demand for low current, low Non Repeatable Run Out (NNRO), impact resistance and vibration resistance has increased.

As spindle motors for hard disk drive (HDD) have been applied to various portable products such as netbooks, mobile phones, portable multimedia players (PMP), and game machines, research into the miniaturization thereof has been conducted.

In this manner, as spindle motors are applied to various portable devices, demand has increased for reduced power consumption and low-temperature starting characteristics. However, a conventional spindle motor requires a thrust dynamic pressure part to have a large outer diameter in order to ensure sufficient sealing force to prevent the leakage of lubricating oil, as well as to ensure internal pressure balance.

Such a conventional spindle motor has problems such as an increase in friction loss and defects upon starting caused by an increase in starting torque.

In order to solve these problems, when the downsizing of the thrust dynamic pressure part is attempted, troubles with lubricating oil sealing force, pressure balance, and high temperature happen.

SUMMARY OF THE INVENTION

An aspect of the present invention provides a hydrodynamic bearing assembly having thrust dynamic pressure generating parts formed in a lower portion of an exterior end of the sleeve along an outer diameter direction thereof and an upper portion of a protrusion at an end of the sleeve along an inner diameter direction thereof to allow for a reduction in starting friction torque in a motor while the motor has no reduction in lifting force, and the motor having the hydrodynamic bearing assembly.

According to an aspect of the present invention, there is provided a hydrodynamic bearing assembly including: a sleeve against which a shaft is supported so that an upper end of the shaft, being compressed and inserted into a hub base of a rotor case, protrudes upwardly in an axial direction; a first thrust dynamic pressure generating part formed in at least one of a protrusion and the hub base corresponding to the protrusion, the protrusion being formed at an end of the sleeve along an inner diameter direction; and a second thrust dynamic pressure generating part formed around a protruding end portion of the sleeve, the protruding end portion facing an upper portion of a stopper part in the axial direction and the stopper part rotating together with the rotor case. Also, an oil sealing part has an oil interface between an outer circumferential surface of the sleeve along an outer diameter direction and an inner surface of the stopper part.

The sleeve may include a bypass channel penetrating the sleeve in the axial direction between the first thrust dynamic pressure generating part and the second thrust dynamic pressure generating part.

Two radial dynamic pressure generating parts may be formed in the axial direction along at least one of an outer diameter of the shaft and an inner diameter of the sleeve.

The first thrust dynamic pressure generating part and the second thrust dynamic pressure generating part may have a pumping groove to increase pressure in the inner diameter direction.

The pumping groove may have a spiral shape or an in-pump herringbone shape.

According to another aspect of the present invention, there is provided a hydrodynamic bearing assembly including: a sleeve against which a shaft is supported so that an upper end of the shaft, being compressed and inserted into a hub base of a rotor case, protrudes upwardly in an axial direction; a first thrust dynamic pressure generating part formed in at least one of a protrusion and the hub base corresponding to the protrusion, the protrusion being formed at an end of the sleeve along an inner diameter direction; a sleeve housing into which an outer circumferential surface of the sleeve is inserted; and a second thrust dynamic pressure generating part formed around a protruding end portion of the sleeve housing, the protruding end portion facing an upper portion of a stopper part in the axial direction and the stopper part rotating together with the rotor case. Also, an oil sealing part has an oil interface between an outer circumferential surface of the sleeve housing along an outer diameter direction and an inner surface of the stopper part.

The hydrodynamic bearing assembly may include a bypass channel formed by penetrating the sleeve or the sleeve housing in the axial direction between the first thrust dynamic pressure generating part and the second thrust dynamic pressure generating part.

Two radial dynamic pressure generating parts may be formed in the axial direction along at least one of an outer diameter of the shaft and an inner diameter of the sleeve.

The first thrust dynamic pressure generating part and the second thrust dynamic pressure generating part may have a pumping groove to increase pressure in the inner diameter direction.

The pumping groove may have a spiral shape or an in-pump herringbone shape.

According to another aspect of the present invention, there is provided a motor including: the hydrodynamic bearing assembly supporting a shaft; a stator having a support to which the hydrodynamic bearing assembly is fixed; and a rotor having a magnet generating an electromagnetic force by interaction between a coil of the stator and the magnet.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
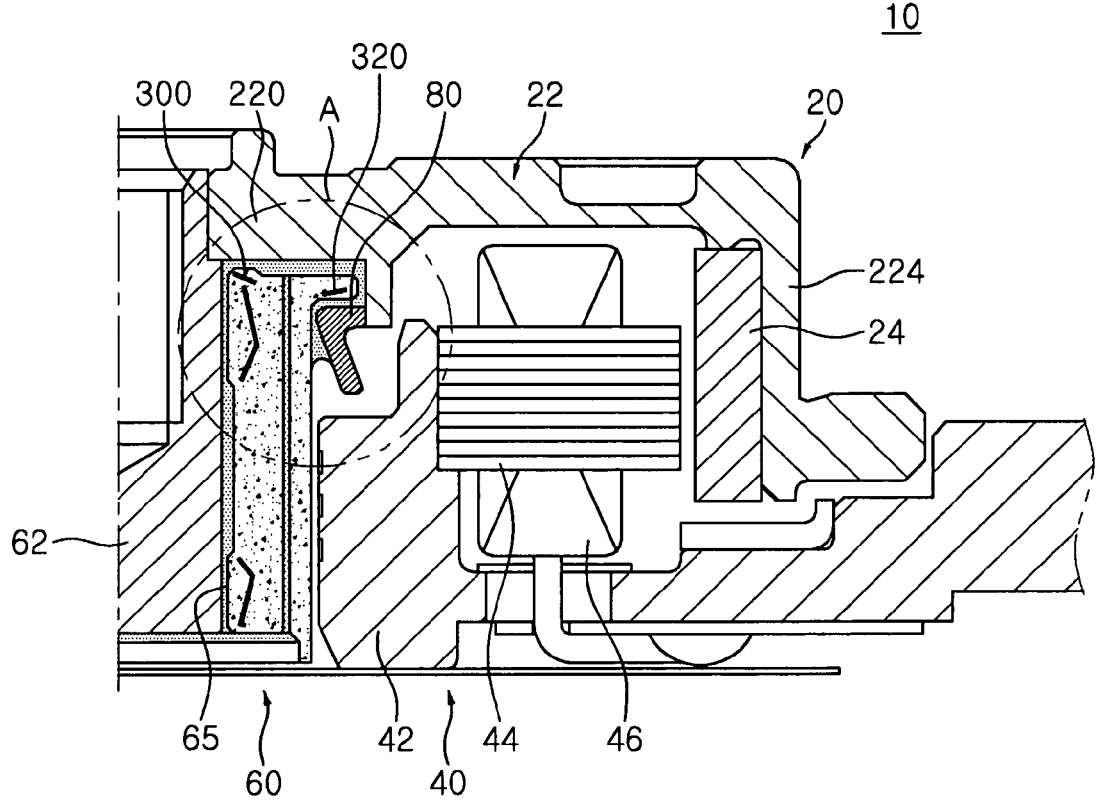
FIG. 1 is a schematic sectional view illustrating a motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Figure 2:
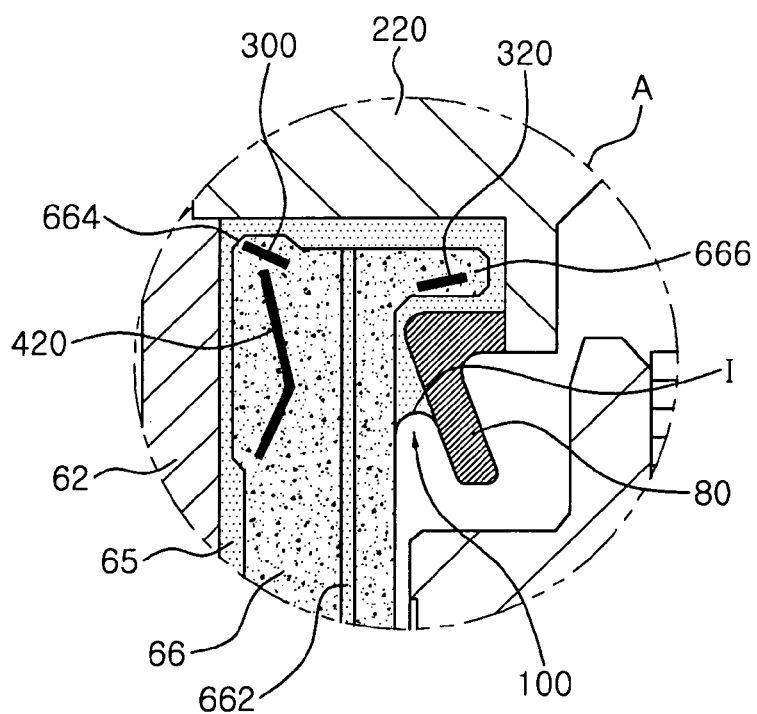
FIG. 2 is a schematic enlarged sectional view illustrating a portion A of FIG. 1.

FIG. 1 is a schematic sectional view illustrating a motor according to an exemplary embodiment of the present invention. FIG. 2 is a schematic enlarged sectional view illustrating a portion A of FIG. 1.

Referring to FIGS. 1 and 2, a motor 10 according to this embodiment may include a hydrodynamic bearing assembly 60, a stator 40 and a rotor 20.

The hydrodynamic bearing assembly 60 may be disposed at the inside of a support 42 of the stator 40 and be fixed thereto. The hydrodynamic bearing assembly 60 may include a sleeve 66, a first thrust dynamic pressure generating part 300, and a second thrust dynamic pressure generating part 320.

Exemplary embodiments of the hydrodynamic bearing assembly 60 will be described below. The motor 10 according to the present invention may have all the specific features of the respective exemplary embodiments of the hydrodynamic bearing assembly 60.

The rotor 20 may have a rotor case 22, shaped like a cup, which has a magnet 24, shaped like a ring, corresponding to coils 46 of the stator 40 along an outer circumference thereof. The magnet 24 is a permanent magnet that has north and south magnetic poles alternately arranged in a circumferential direction to generate a magnetic field having a predetermined magnitude.

Here, the rotor case 22 includes a hub base 220 and a magnet support 224. The hub base 220 is pressed against an upper end of a shaft 62 and is fixed. The magnet support 224 extends from the hub base 220 along an outer diameter direction and is bent downwardly in an axial direction to thereby support the magnet 24 of the rotor 20.

As viewed in FIG. 1, the axial direction refers to a vertical direction on the basis of the shaft 62, and an outer or inner diameter direction refers to a direction of an exterior end of the rotor 20 on the basis of the shaft 62 or a central direction of the shaft 62 on the basis of the exterior end of the rotor 20.

The stator 40 includes the support 42 engaged with an outer circumferential surface of the hydrodynamic bearing assembly 60 to fix the hydrodynamic bearing assembly 60, a plurality of cores 44 fixed to the support 42, and the coils 46 wound around the cores 44.

The rotor 20 rotates by electromagnetic interaction between the coils 46 and the magnet 24.

Hereinafter, the respective exemplary embodiments of the hydrodynamic bearing assembly according to the present invention will be described in detail.

First, the technical features that the respective exemplary embodiments have in common are that the hydrodynamic bearing assembly 60 may include the sleeve 66, the first thrust dynamic pressure generating part 300, and the second thrust dynamic pressure generating part 320.

The sleeve 66 supports the shaft 62 so that the upper end of the shaft 62 protrudes upwardly in the axial direction.

Here, the shaft 62 is inserted into a shaft hole 65 of the sleeve 66 with a fine gap therebetween. Oil fills the fine gap, thereby supporting the rotation of the rotor 20 by dynamic pressure generated by radial dynamic pressure generating parts 420 formed in at least one of an outer diameter of the shaft 62 and an inner diameter of the sleeve 66.

Meanwhile, an oil sealing part 100 may have an oil interface I between an outer circumferential surface of the sleeve 66 along the outer diameter direction thereof and an inner surface of a stopper part 80 which rotates together with the rotor case 22.

The oil is sealed by capillary action in a fine gap between the outer circumferential surface of the sleeve 66 along the outer diameter direction thereof and the inner surface of the stopper part 80. The stopper part 80 may be formed downwardly in the axial direction in such a manner that the stopper part 80 is tapered along the outer diameter direction.

The first thrust dynamic pressure generating part 300 may be formed in an upper portion of a protrusion 664 that is formed at an end of the sleeve 66 along the inner diameter direction thereof. The second thrust dynamic pressure generating part 320 may be formed in a lower portion of a protruding end portion 666 of the sleeve 66 which faces an upper portion of the stopper part 80 in the axial direction thereof.

As an outer diameter of the first thrust dynamic pressure generating part 300 is smaller, a reduction in starting friction torque and operating friction torque may be achieved. As an outer diameter of the second thrust dynamic pressure generating part 320 is larger, a reduction in oil sealing force, internal pressure balance and lifting force that is caused due to the smaller outer diameter of the first thrust dynamic pressure generating part 300 may be alleviated.

The first and second thrust dynamic pressure generating parts 300 and 320 may have a pumping groove that increases pressure in the inner diameter direction.

Particularly, the second thrust dynamic pressure generating part 320 is arranged adjacent to the oil sealing part 100, so that oil sealing capability may be maximized.

The sleeve 66 includes a bypass channel 662 penetrating the sleeve 66 in the axial direction between the first thrust dynamic pressure generating part 300 and the second thrust dynamic pressure generating part 320, so that the internal pressure of the hydrodynamic bearing assembly 60 may be distributed.

Figure 3:
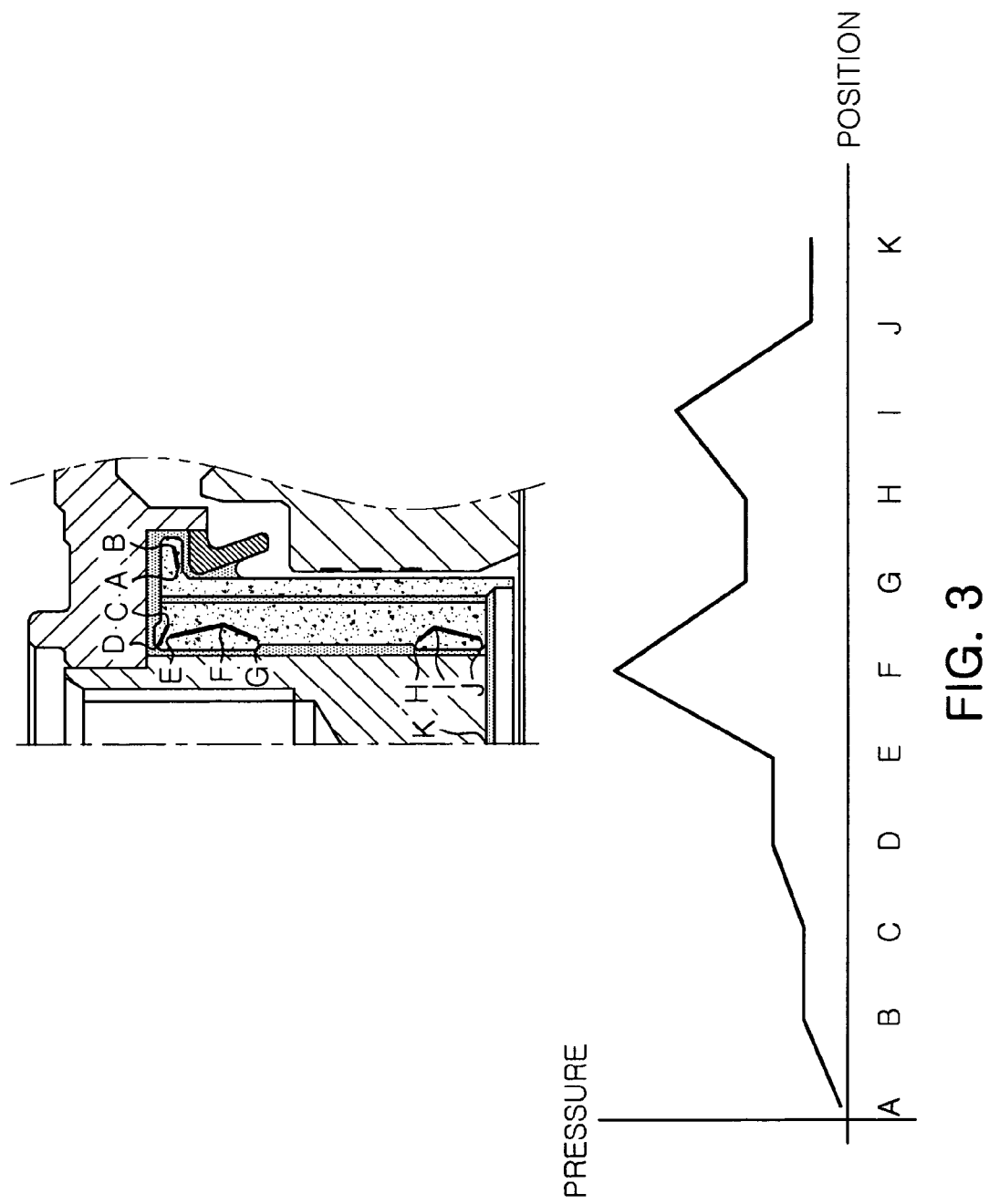
FIG. 3 is a schematic view illustrating the internal pressure balance of a hydrodynamic bearing assembly in a motor according to an exemplary embodiment of the present invention.

FIG. 3 is a schematic view illustrating the internal pressure balance of a hydrodynamic bearing assembly in a motor according to an exemplary embodiment of the present invention.

Referring to FIG. 3, a pressure balance from the second thrust dynamic pressure generating part 320 (position A) to a center of the shaft 62 (position K) is roughly understood.

In the case that a thrust dynamic pressure generating part is present at only the inside or one side of the upper portion of the sleeve, this construction has no thrust dynamic pressure generated by the second thrust dynamic pressure generating part 320. Accordingly, there may be no dynamic pressure generated at positions A and B.

In the case that no dynamic pressure is generated, when a motor suddenly stops, negative pressure may occur at part of the motor. Since the motor is not lifted, friction torque during the driving of the motor greatly increases.

According to this embodiment, however, since pressure is evenly balanced, such a problem may be solved.

Figure 4:
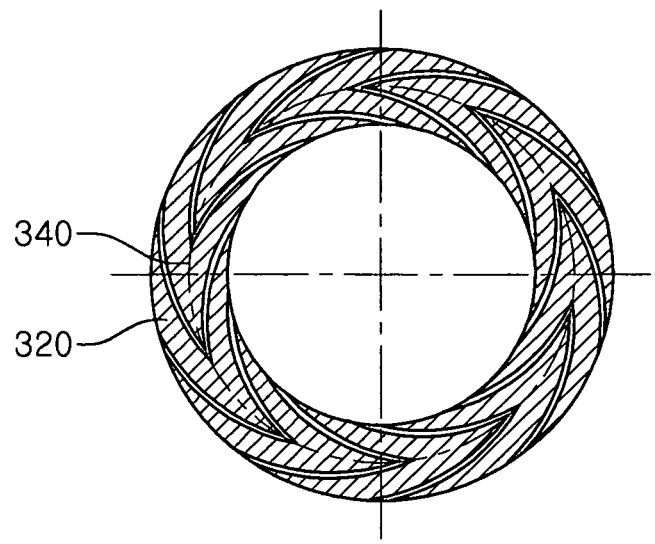
FIG. 4 is a schematic view illustrating a pumping groove having a herringbone shape which is formed in a thrust dynamic pressure generating part according to an exemplary embodiment of the present invention.
Figure 5:
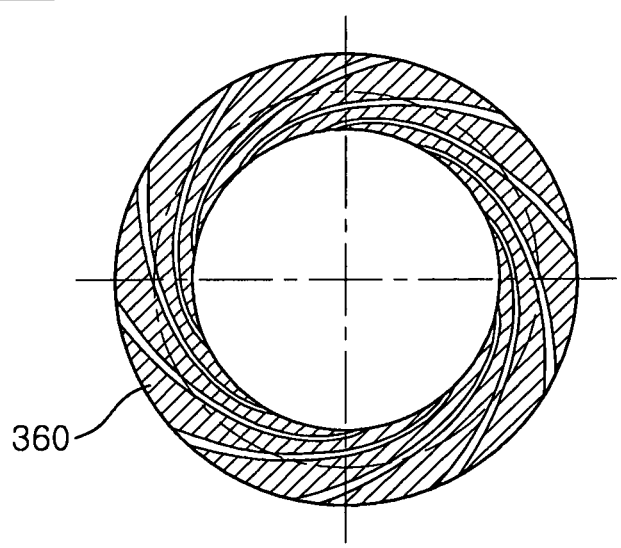
FIG. 5 is a schematic view illustrating a pumping groove having a spiral shape which is formed in a thrust dynamic pressure generating part according to an exemplary embodiment of the present invention.

FIG. 4 is a schematic view illustrating a pumping groove having a herringbone shape which is formed in a thrust dynamic pressure generating part according to an exemplary embodiment of the present invention. FIG. 5 is a schematic view illustrating a pumping groove having a spiral shape which is formed in a thrust dynamic pressure generating part according to an exemplary embodiment of the present invention.

Reviewing a pumping groove that is formed in the thrust dynamic pressure generating part 300 with reference to FIGS. 4 and 5, FIG. 4 is a pattern view illustrating herringbone grooves of a thrust dynamic pressure generating part according to an exemplary embodiment of the invention, and FIG. 5 is a pattern view illustrating spiral grooves of a thrust dynamic pressure generating part according to another exemplary embodiment of the invention.

The pumping groove, shown in FIG. 4, which has an in-pump herringbone shape, is formed of continuous herringbone grooves 320 having intermediate curved portions 340. The pumping groove, shown in FIG. 5, which has a spiral shape, includes continuous spiral grooves 360.

Figure 6:
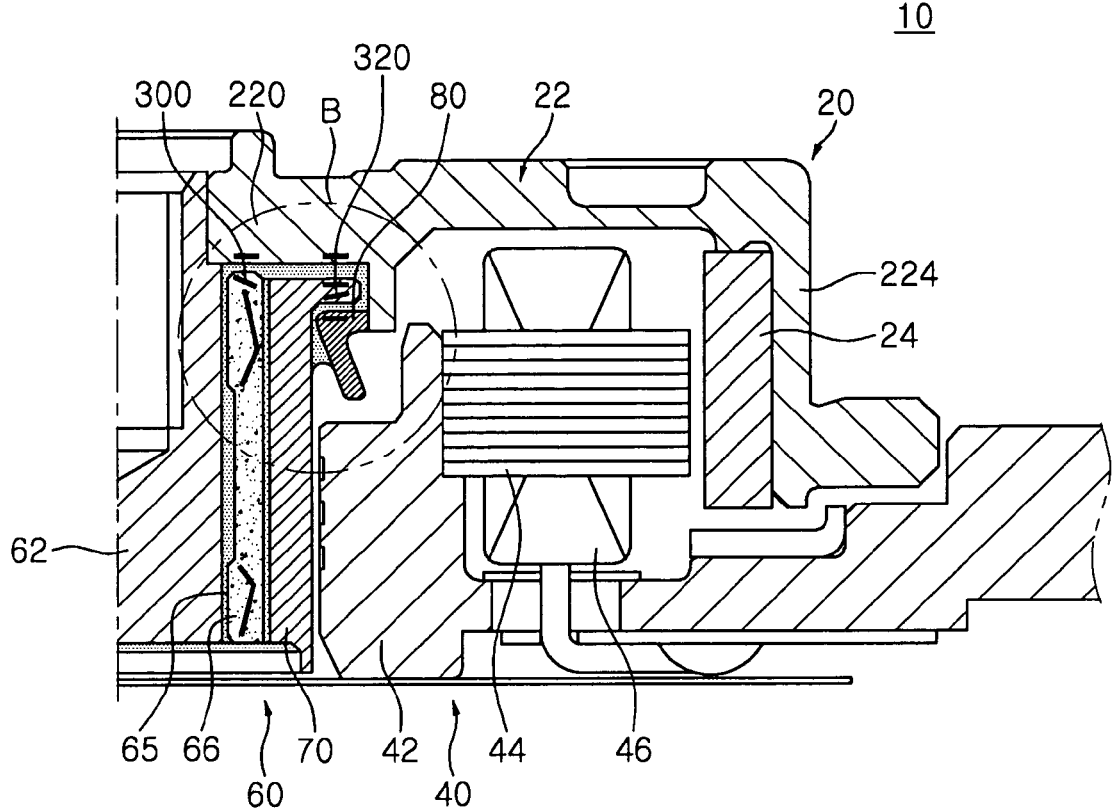
FIG. 6 is a schematic sectional view illustrating a motor according to another exemplary embodiment of the present invention.
Figure 7:
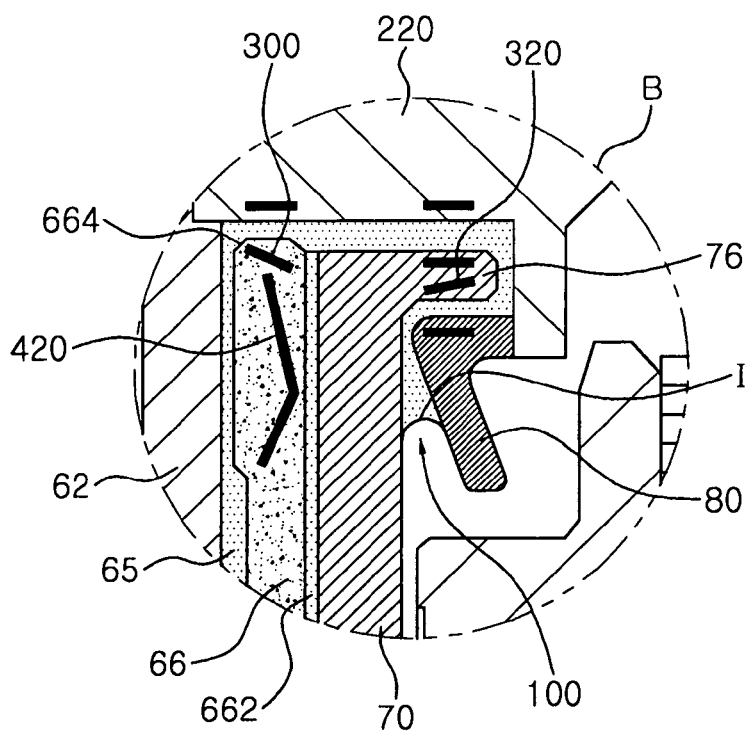
FIG. 7 is a schematic enlarged sectional view illustrating a portion B of FIG. 6.

FIG. 6 is a schematic sectional view illustrating a motor according to another exemplary embodiment of the present invention. FIG. 7 is a schematic enlarged sectional view illustrating a portion B of FIG. 6.

A structural difference between the embodiment shown in FIGS. 6 and 7 and that of FIGS. 1 and 2 is in the position in which the first and second thrust dynamic pressure generating parts 300 and 320 are formed.

The first thrust dynamic pressure generating part 300 may be formed in at least one of the protrusion 664 that is formed at the end of the sleeve 66 along the inner diameter direction thereof and the hub base 220 corresponding to the protrusion 664.

Also, the second thrust dynamic pressure generating part 320 may be formed around a protruding end portion 76 of the sleeve 66, i.e., in a counterpart component corresponding to the protruding end portion 76.

The second thrust dynamic pressure generating part 320 may be formed in at least one of an upper portion of the protruding end portion 76 and the hub base 220 corresponding to the protruding end portion 76. Otherwise, the second thrust dynamic pressure generating part 320 may be formed in a lower portion of the protruding end portion 76 and the upper portion of the stopper part 80 corresponding to the protruding end portion 76.

Figure 8:
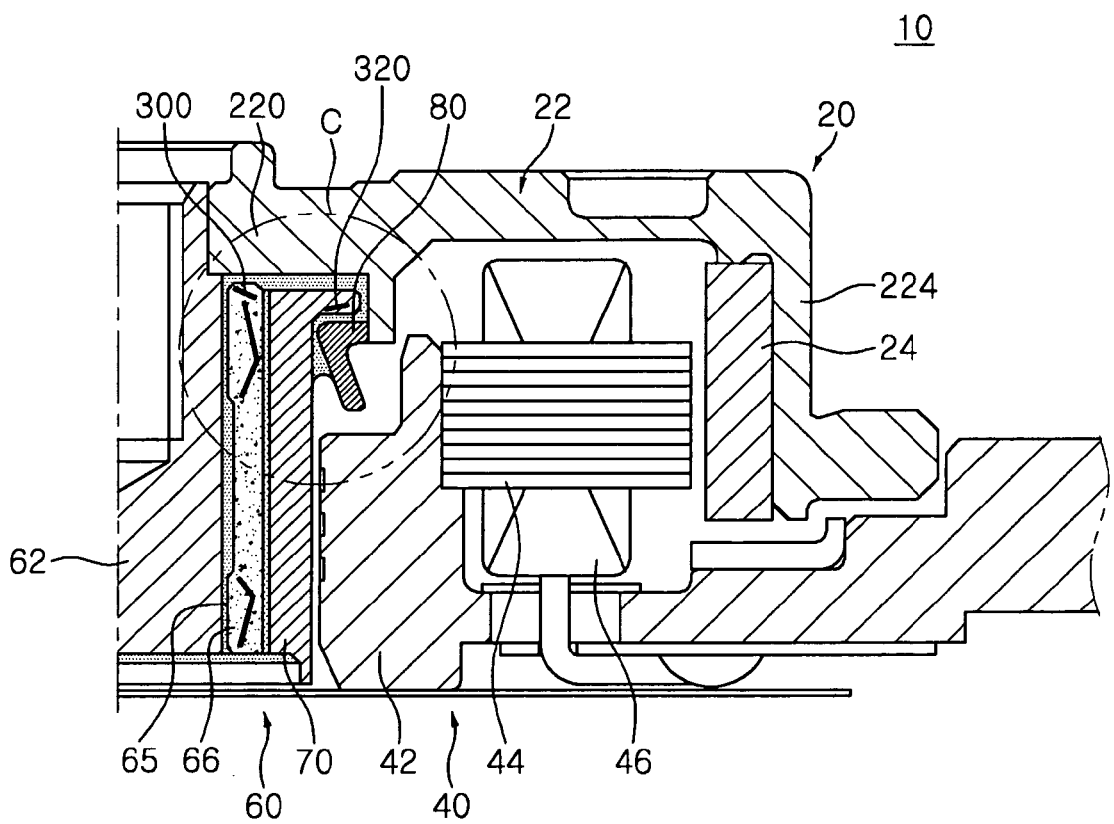
FIG. 8 is a schematic sectional view illustrating a motor according to another exemplary embodiment of the present invention.
Figure 9:
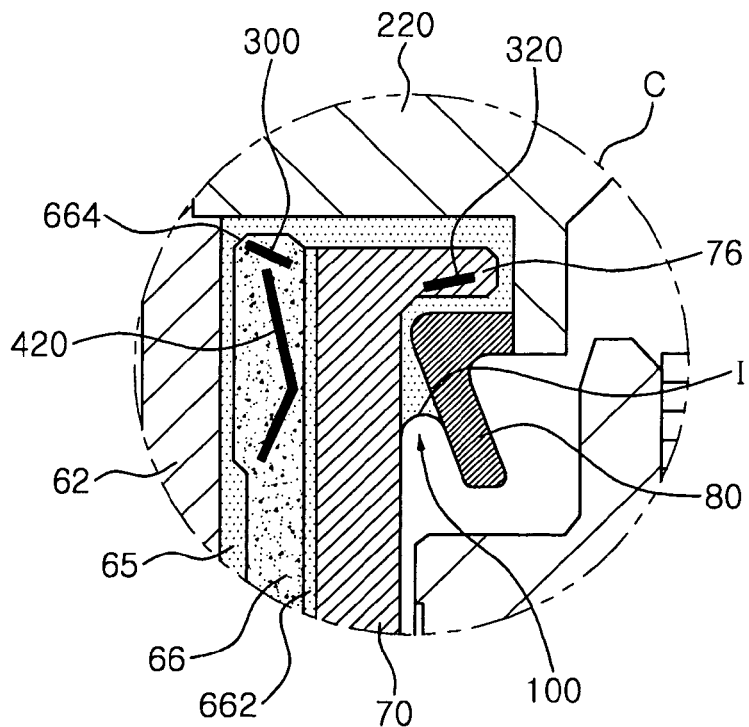
FIG. 9 is a schematic enlarged sectional view illustrating a portion C of FIG. 8.

FIG. 8 is a schematic sectional view illustrating a motor according to another exemplary embodiment of the present invention. FIG. 9 is a schematic enlarged sectional view illustrating a portion C of FIG. 8.

A structural difference between the embodiment shown in FIGS. 8 and 9 and that of FIGS. 1 and 2 is that the sleeve 66 is constructed to be narrow and a sleeve housing 70 where the outer circumferential surface of the sleeve 66 is inserted is further included.

By having such a structure, the first thrust dynamic pressure generating part 300 is formed in the upper portion of the protrusion 664 that is formed at the end of the sleeve 66 along the inner diameter direction thereof, while the second thrust dynamic pressure generating part 320 is formed in the lower portion of the protruding end portion 76 of the sleeve housing 70 which faces the upper portion of the stopper part 80 in the axial direction thereof.

Despite such a structural difference, the embodiment shown in FIGS. 8 and 9 may have the same effect as that shown in FIGS. 1 and 2.

In a hydrodynamic bearing assembly and a motor having the same, according to the present invention, the first thrust dynamic pressure generating part has a small outer diameter, and thus friction torque may be reduced.

Besides the first thrust dynamic pressure generating part, the second thrust dynamic pressure generating part is additionally included to supplement the lifting force of the motor, and thus the lifting force of the motor may not be deteriorated.

Also, the second thrust dynamic pressure generating part is arranged adjacent to the oil sealing part to allow for the pumping of oil, and thus the leakage of the oil in the oil sealing part may be reduced.

Furthermore, the second thrust dynamic pressure generating part is provided at the outside of the bypass channel in the outer diameter direction, and thus internal negative pressure may be prevented and pressure balance may be adjusted.

As set forth above, in a hydrodynamic bearing assembly and a motor having the same according to exemplary embodiments of the invention, friction torque is reduced due to the small outer diameter of the first thrust dynamic pressure generating part.

Also, a reduction in the lifting force of the motor does not occur since there is provided the second thrust dynamic pressure generating part allowing for the lifting force of the motor to be supplemented in addition to the first thrust dynamic pressure generating part.

Furthermore, a reduction of oil leakage in the oil sealing part is achieved by arranging the second thrust dynamic pressure generating part adjacent to the oil sealing part to pump oil.

In addition, internal negative pressure is prevented and pressure balance is adjusted since the second thrust dynamic pressure generating part is provided at the outside of the bypass channel in the outer diameter direction.

While the present invention has been shown and described in connection with the exemplary embodiments, it will be apparent to those skilled in the art that modifications and variations can be made without departing from the spirit and scope of the invention as defined by the appended claims.

What is claimed is:

1. A hydrodynamic bearing assembly comprising:
   a sleeve against which a shaft is supported so that an upper end of the shaft, being compressed and inserted into a hub base of a rotor case, protrudes upwardly in an axial direction;
   a first thrust dynamic pressure generating part formed in at least one of a protrusion and the hub base corresponding to the protrusion, the protrusion being formed at an end of the sleeve along an inner diameter direction; and
   a second thrust dynamic pressure generating part formed around a protruding end portion of the sleeve, the protruding end portion facing an upper portion of a stopper part in the axial direction and the stopper part rotating together with the rotor case,
   wherein an oil sealing part has an oil interface between an outer circumferential surface of the sleeve along an outer diameter direction and an inner surface of the stopper part.

2. The hydrodynamic bearing assembly of claim 1, wherein the second thrust dynamic pressure generating part is formed in at least one of an upper portion of the protruding end portion and the hub base corresponding to the protruding end portion.

3. The hydrodynamic bearing assembly of claim 1, wherein the second thrust dynamic pressure generating part is formed in a lower portion of the protruding end portion and the upper portion of the stopper part corresponding to the protruding end portion.

4. The hydrodynamic bearing assembly of claim 1, wherein the sleeve includes a bypass channel penetrating the sleeve in the axial direction between the first thrust dynamic pressure generating part and the second thrust dynamic pressure generating part.

5. The hydrodynamic bearing assembly of claim 1, wherein two radial dynamic pressure generating parts are formed in the axial direction along at least one of an outer diameter of the shaft and an inner diameter of the sleeve.

6. The hydrodynamic bearing assembly of claim 1, wherein the first thrust dynamic pressure generating part and the second thrust dynamic pressure generating part have a pumping groove to increase pressure in the inner diameter direction.

7. The hydrodynamic bearing assembly of claim 6, wherein the pumping groove has a spiral shape or an in-pump herringbone shape.

8. A hydrodynamic bearing assembly comprising:
   a sleeve against which a shaft is supported so that an upper end of the shaft, being compressed and inserted into a hub base of a rotor case, protrudes upwardly in an axial direction;
   a first thrust dynamic pressure generating part formed in at least one of a protrusion and the hub base corresponding to the protrusion, the protrusion being formed at an end of the sleeve along an inner diameter direction;
   a sleeve housing into which an outer circumferential surface of the sleeve is inserted; and
   a second thrust dynamic pressure generating part formed around a protruding end portion of the sleeve housing, the protruding end portion facing an upper portion of a stopper part in the axial direction and the stopper part rotating together with the rotor case,
   wherein an oil sealing part has an oil interface between an outer circumferential surface of the sleeve housing along an outer diameter direction and an inner surface of the stopper part.

9. The hydrodynamic bearing assembly of claim 8, wherein the second thrust dynamic pressure generating part is formed in at least one of an upper portion of the protruding end portion and the hub base corresponding to the protruding end portion.

10. The hydrodynamic bearing assembly of claim 8, wherein the second thrust dynamic pressure generating part is formed in a lower portion of the protruding end portion and the upper portion of the stopper part corresponding to the protruding end portion.

11. The hydrodynamic bearing assembly of claim 8, wherein a bypass channel is provided by penetrating the sleeve or the sleeve housing in the axial direction between the first thrust dynamic pressure generating part and the second thrust dynamic pressure generating part.

12. The hydrodynamic bearing assembly of claim 8, wherein two radial dynamic pressure generating parts are formed in the axial direction along at least one of an outer diameter of the shaft and an inner diameter of the sleeve.

13. The hydrodynamic bearing assembly of claim 8, wherein the first thrust dynamic pressure generating part and the second thrust dynamic pressure generating part have a pumping groove to increase pressure in the inner diameter direction.

14. The hydrodynamic bearing assembly of claim 13, wherein the pumping groove has a spiral shape or an in-pump herringbone shape.

15. A motor comprising:
    the hydrodynamic bearing assembly of claim 1 supporting a shaft;
    a stator having a support to which the hydrodynamic bearing assembly is fixed; and
    a rotor having a magnet generating an electromagnetic force by interaction between a coil of the stator and the magnet.

16. A motor comprising:
    the hydrodynamic bearing assembly of claim 8 supporting a shaft;
    a stator having a support to which the hydrodynamic bearing assembly is fixed; and
    a rotor having a magnet generating an electromagnetic force by interaction between a coil of the stator and the magnet.

* * * * *